United States Patent
Cho et al.

(10) Patent No.: US 12,548,237 B2
(45) Date of Patent: Feb. 10, 2026

(54) APPARATUS AND METHOD FOR SYNTHESIZING 2D IMAGE AND MEDIA USING INVERSE RENDERING WITH 3D SPATIALLY VARYING LIGHTING INFORMATION ESTIMATION

(71) Applicant: KOREA INSTITUTE OF SCIENCE AND TECHNOLOGY, Seoul (KR)

(72) Inventors: Junghyun Cho, Seoul (KR); Ig Jae Kim, Seoul (KR); Haesol Park, Seoul (KR); Jun Yong Choi, Seoul (KR); Seok Yeong Lee, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 252 days.

(21) Appl. No.: 18/393,078

(22) Filed: Dec. 21, 2023

(65) Prior Publication Data
US 2025/0157131 A1 May 15, 2025

(30) Foreign Application Priority Data
Nov. 15, 2023 (KR) .................. 10-2023-0158155

(51) Int. Cl.
*G06T 15/20* (2011.01)
*G06T 15/50* (2011.01)

(52) U.S. Cl.
CPC ............ *G06T 15/20* (2013.01); *G06T 15/506* (2013.01)

(58) Field of Classification Search
None
See application file for complete search history.

(56) References Cited

U.S. PATENT DOCUMENTS 9,563,959 B2  2/2017 Shim et al.
10,950,037 B2 3/2021 Sunkavalli et al.
(Continued)

FOREIGN PATENT DOCUMENTS

JP  2021-149679 A   9/2021
KR  10-1885090 B1   8/2018
KR  10-2398850 B1   5/2022

OTHER PUBLICATIONS

Li et al. "Inverse Rendering for Complex Indoor Scenes: Shape, Spatially-Varying Lighting and SVBRDF from a Single Image" *Proceedings of the IEEE/CVF Conference on Computer Vision and Pattern Recognition.* 2020 (pp. 1-10).
(Continued)

*Primary Examiner* — Nurun Flora
(74) *Attorney, Agent, or Firm* — NSIP Law

(57) ABSTRACT

The present disclosure relates to an apparatus for synthesizing a 2D image and media using a reverse rendering including 3D spatially varying lighting information estimation, and the apparatus includes a target view analysis unit configured to estimate a normal map and direct lighting using a plurality of 2D images, a material estimation unit configured to reflect the normal map and direct lighting estimated from the target view analysis unit and estimate material information, a 3D lighting estimation unit configured to reflect the direct lighting estimated from the target view analysis unit and the material information estimated from the material estimation unit and estimate 3D spatially varying lighting information, and an image generation unit configured to reflect the estimated shapes, materials, and 3D spatially varying lighting information, synthesize the 2D images with 3D objects, and generate a synthesized image.

13 Claims, 11 Drawing Sheets

(56) References Cited

U.S. PATENT DOCUMENTS

| | | |
|---|---|---|
| 11,151,780 B2 | 10/2021 | Dong et al. |
| 11,295,514 B2* | 4/2022 | Gu ................... G06N 3/0455 |
| 11,967,024 B2* | 4/2024 | Munkberg ............ G06N 3/045 |
| 2021/0012576 A1 | 1/2021 | Riegler et al. |
| 2024/0096011 A1* | 3/2024 | Sevastopolskiy ....... G06T 15/10 |
| 2025/0232518 A1* | 7/2025 | Chatterjee ............... G06T 7/246 |

OTHER PUBLICATIONS

Wang et al. "Learning Indoor Inverse Rendering with 3D Spatially-Varying Lighting" *Proceedings of the IEEE/CVF International Conference on Computer Vision*, arXiv:2109.06061v2, Oct. 20, 2021 (pp. 1-10).

Choi et al. "MAIR: Multi-view Attention Inverse Rendering with 3D Spatially-Varying Lighting Estimation" *2023 IEEE/CVF Conference on Computer Vision and Pattern Recognition (CVPR)*. IEEE, arXiv:2303.12368v1, Mar. 22, 2023 (pp. 1-20).

Choi et al. "MAIR: Multi-view Attention Inverse Rendering with 3D Spatially-Varying Lighting Estimation" *2023 IEEE/CVF Conference on Computer Vision and Pattern Recognition (CVPR)*. arXiv:2303.12368v2, Mar. 27, 2023 (pp. 1-20).

* cited by examiner

FIG. 10

| Scene | Lighthouse | RELATED ART | PRESENT DISCLOSURE |
|---|---|---|---|
| OpenRooms FF | - | 0.220 | 0.780 |
| IBRNet | 0.120 | 0.180 | 0.700 |
| IBRNet (chrome) | 0.186 | 0.025 | 0.789 |

APPARATUS AND METHOD FOR SYNTHESIZING 2D IMAGE AND MEDIA USING INVERSE RENDERING WITH 3D SPATIALLY VARYING LIGHTING INFORMATION ESTIMATION

CROSS-REFERENCE TO RELATED APPLICATIONS

This application claims the benefit under 35 USC 119 (a) of Korean Patent Application No. 10-2023-0158155 filed on Nov. 15, 2023, in the Korean Intellectual Property Office, the entire disclosure of which is incorporated herein by reference for all purposes.

TECHNICAL FIELD

The present disclosure relates to an apparatus and a method for synthesizing a 2D image and media using a reverse rendering including 3D spatially varying lighting information estimation, and more specifically, to an apparatus and a method for synthesizing a 2D image and media using a reverse rendering including 3D spatially varying lighting information estimation, which may estimate 3D spatially varying lighting information using multi-view images and position an object in a 3D space using the estimated lighting information.

EXPLANATION ON STATE-SUPPORTED RESEARCH AND DEVELOPMENT

This study was conducted with the support of hologram core technology development (R&D) of the Ministry of Science and ICT [(General) plenoptic-based hologram core technology development, (detail 1) development of ultra-high-resolution unstructured plenoptic video authoring/playback platform technology for medium and large spaces, project identification number: 1711193332, detailed project number: 2020-0-00457-004].

This study was conducted with the support of immersive content core technology development of the Ministry of Science and ICT [robust 3D object identification technology in varying view acceptable realistic images, project identification number: 1711196405, detailed project number: 00227592].

BACKGROUND ART

In order to generate new images by synthesizing images, conventionally, as illustrated in FIG. 1, the images have been synthesized by a method of separating objects from 2D images (images) and simply synthesizing the separated 2D object images with 2D background images.

In this case, there is a problem in that it is difficult to perform shading, shadowing, and relighting processing that combines features (e.g., lighting and shapes) of various scenes captured in the background images with features of the objects.

In order to solve this problem, conventionally, objects and backgrounds are restored from 2D images into 3D formats, and synthesized images are generated by using a rendering method (see FIG. 2).

However, this method also has a problem in that a process of de-lighting light included in the images when objects and backgrounds are restored is required and many features are simplified during the rendering process.

In addition, conventionally, materials, shapes, and lighting information of elements constituting the space is extracted by performing a scene-level reverse rendering using single-view images.

However, there is a problem in that since the lighting information extracted by using the single-view images is calculated in units of 2D pixel, objects may not be positioned in a 3D space.

DESCRIPTION OF THE INVENTION

Technical Problem

The present disclosure has been made in efforts to solve the conventional problems and is directed to providing an apparatus and a method for synthesizing a 2D image and media using a reverse rendering including 3D spatially varying lighting information estimation, which may estimate materials, shapes, and 3D spatially varying lighting information by performing reverse rendering using multi-view images and position objects in a 3D space using the estimated materials, shapes, and 3D spatially varying lighting information.

The present disclosure is also directed to providing an apparatus and a method for synthesizing a 2D image and media using a reverse rendering including 3D spatially varying lighting information estimation, which may generate novel view images using the estimated materials, shapes, and 3D spatially varying lighting information using multi-view images.

Technical Solution

In order to achieve the objects, an embodiment of the present disclosure provides an apparatus for synthesizing a 2D image and media using a reverse rendering including 3D spatially varying lighting information estimation, the apparatus including: a target view analysis unit configured to estimate a normal map and direct lighting using a plurality of 2D images; a material estimation unit configured to reflect the normal map and direct lighting estimated from the target view analysis unit and estimate material information; a 3D lighting estimation unit configured to reflect the direct lighting estimated from the target view analysis unit and the material information estimated from the material estimation unit and estimate 3D spatially varying lighting information; and an image generation unit configured to reflect the estimated shapes, materials, and 3D spatially varying lighting information, synthesize the 2D images with 3D objects, and generate a synthesized image.

In addition, in the apparatus for synthesizing the 2D image and media using the reverse rendering including 3D spatially varying lighting information estimation according to the present disclosure, the target view analysis unit may include: a normal map estimation unit configured to receive RGB images acquired from the plurality of 2D images, a depth map, and a confidence map and estimate a normal map from the depth map; an incident lighting estimation unit configured to estimate incident direct lighting using the RGB images, the depth map, the confidence map, and the normal map; and an exitant lighting estimation unit configured to estimate exitant direct lighting using the RGB images, the depth map, the confidence map, and the normal map.

In addition, in the apparatus for synthesizing the 2D image and media using the reverse rendering including 3D spatially varying lighting information estimation according to the present disclosure, the material estimation unit may include: a specular radiance estimation unit configured to estimate a specular radiance feature ($f_{spec}$) based on the normal map and an incident direct lighting estimated value $\eta, \lambda, \xi$ estimated from the target view analysis unit; a context estimation unit configured to estimate a context feature ($f_{context}$) based on the RGB images, the depth map, and the confidence map; a multi-view aggregation unit configured to aggregate the specular radiance feature ($f_{spec}$), the context feature ($f_{context}$), and multi-view RGB images and generate a multi-view aggregation feature; and an albedo and roughness estimation unit configured to estimate albedo and roughness based on the RGB images, the depth map, the confidence map, the context feature ($f_{context}$), and a bidirectional reflectance distribution function (BRDF) feature ($f_{BRDF}$) output from the multi-view aggregation unit.

In addition, in the apparatus for synthesizing the 2D image and media using the reverse rendering including 3D spatially varying lighting information estimation according to the present disclosure, the 3D lighting estimation unit may reflect the RGB images, the depth map, the confidence map, an exitant direct lighting volume estimated from the target view analysis unit, and the albedo and roughness information estimated from the material estimation unit, estimate the 3D spatially varying lighting information, and output the 3D spatially varying lighting volume.

In addition, in the apparatus for synthesizing the 2D image and media using the reverse rendering including 3D spatially varying lighting information estimation according to the present disclosure, the image generation unit may reflect the shapes, materials, and 3D spatially varying lighting information estimated from the 3D lighting estimation unit and generate a novel view image.

In addition, in the apparatus for synthesizing the 2D image and media using the reverse rendering including 3D spatially varying lighting information estimation according to the present disclosure, the image generation unit may reflect the shapes, materials, and 3D spatially varying lighting information estimated from the target view analysis unit, the material estimation unit, and the 3D lighting estimation unit, synthesize sounds or 3D objects and the sounds into the 2D images, and generate a synthesized image.

In addition, in order to achieve the objects, an embodiment of the present disclosure provides a method of synthesizing a 2D image and media using a reverse rendering including 3D spatially varying lighting information estimation, the method including: a target view analyzing operation of estimating a normal map and direct lighting using a plurality of 2D images, a material estimating operation of reflecting the estimated normal map and direct lighting and estimating material information; a 3D lighting estimating operation of reflecting the estimated direct lighting and material information and estimating 3D spatially varying lighting information; and an image generating operation of reflecting the estimated shapes, materials, and 3D spatially varying lighting information, synthesizing the 2D images with 3D objects, and generating an image.

In addition, the method of synthesizing the 2D image and media using the reverse rendering including 3D spatially varying lighting information estimation according to the present disclosure, wherein the target view analyzing operation may include receiving RGB images acquired from the plurality of 2D images, a depth map, and a confidence map, estimating a normal map from the depth, estimating incident direct lighting using the RGB images, the depth map, the confidence map, and the normal map, and estimating exitant direct lighting using the RGB images, the depth map, the confidence map, and the normal map.

In addition, the method of synthesizing the 2D image and media using the reverse rendering including 3D spatially varying lighting information estimation according to the present disclosure, the material estimating operation may include estimating a specular radiance feature ($f_{spec}$) based on the normal map and an incident direct lighting estimated value ($\eta, \lambda, \xi$) estimated from the target view analyzing operation, estimating a context feature ($f_{context}$) based on the RGB images, the depth map, and the confidence map, aggregating the specular radiance feature ($f_{spec}$), the context feature ($f_{context}$), and multi-view RGB images and generating a multi-view aggregation feature, and estimating albedo and roughness based on the RGB images, the depth map, the confidence map, the context feature ($f_{context}$), and a bidirectional reflectance distribution function (BRDF) feature ($f_{BRDF}$) output from a multi-view aggregation unit configured to generate the multi-view aggregation feature.

In addition, the method of synthesizing the 2D image and media using the reverse rendering including 3D spatially varying lighting information estimation according to the present disclosure, the 3D lighting estimating operation may include reflecting the RGB images, the depth map, the confidence map, an exitant direct lighting volume estimated from the target view analyzing operation, and the albedo and roughness information estimated from the material estimating operation, estimating the 3D spatially varying lighting information, and outputting the 3D spatially varying lighting volume.

In addition, the method of synthesizing the 2D image and media using the reverse rendering including 3D spatially varying lighting information estimation according to the present disclosure, the image generating operation may include setting positions of the 3D objects to be synthesized into a 2D image when the target 2D image and the 3D objects are input, and calculating lighting information at the set positions of the 3D objects using the 3D spatially varying lighting information volume acquired through the 3D lighting estimating operation and generating an image by rendering the 3D objects including shadows based on the calculated lighting information.

In addition, the method of synthesizing the 2D image and media using the reverse rendering including 3D spatially varying lighting information estimation according to the present disclosure, the image generating operation may further include generating a novel view image using the 3D spatially varying lighting volume acquired through the 3D lighting estimating operation.

In addition, the method of synthesizing the 2D image and media using the reverse rendering including 3D spatially varying lighting information estimation according to the present disclosure, the image generating operation may include reflecting the shapes, materials, and 3D spatially varying lighting information estimated from the 3D lighting estimating operation, synthesizing sounds or 3D objects and the sounds into the 2D images, and generating a synthesized image.

Details of other embodiments are included in "Mode for Invention" and the accompanying "drawings."

Advantages and features of the present disclosure and methods for achieving them will become clear with reference to various embodiments described below in detail in conjunction with the accompanying drawings.

However, it should be noted that the present disclosure is not limited to only the configuration of each embodiment disclosed below but can be implemented in various different forms, each embodiment disclosed in the specification are merely provided to make the disclosure of the present disclosure complete and fully inform those skilled in the art to which the present disclosure pertains of the scope of the present disclosure, and the present disclosure is only defined by the scope of the claims.

Effects of the Invention

According to the present disclosure, by estimating 3D spatially varying lighting information using multi-view images, it is possible to position objects in a 3D space.

In addition, since the multi-view images are used, it is possible to increase the qualities of 2D images-3D object synthesized images.

In addition, it is possible to generate novel view images using lighting information estimated by using multi-view images.

BRIEF DESCRIPTION OF DRAWINGS

FIG. 10 is a view exemplarily illustrating a result of comparing performance of the present disclosure and the related art.

SPECIFIC DETAILS FOR IMPLEMENTING THE INVENTION

Figure 1:
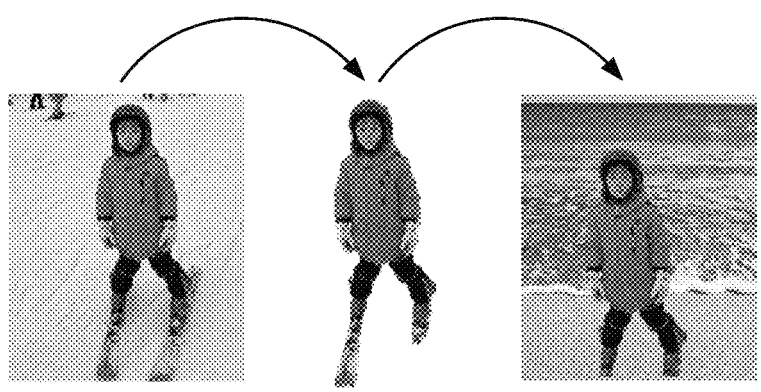
FIGS. 1 and 2 are views for describing a process of generating synthesized images according to the related art.
Figure 2:
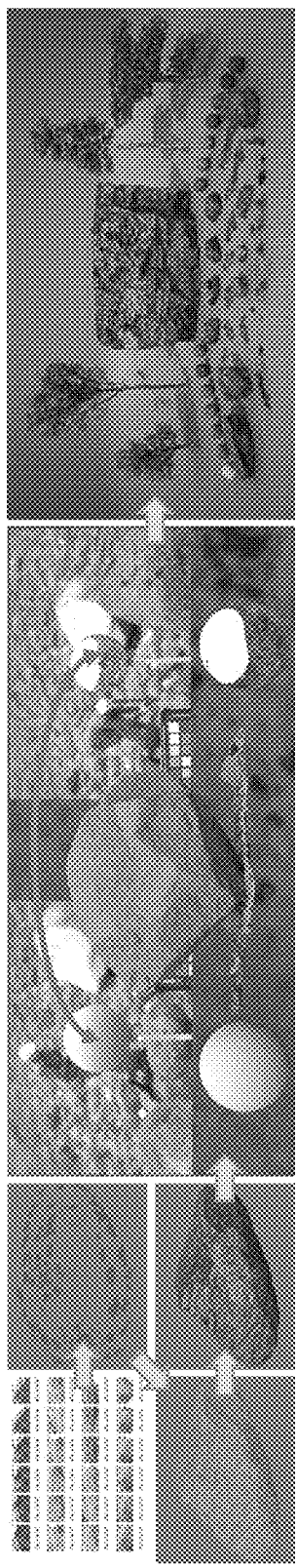

Before specifically describing the present disclosure, it should be noted that the terms or words used in the specification should not be construed as unconditionally limited to their ordinary or dictionary meanings, the inventors of the present disclosure can appropriately define and use the concepts of various terms to describe their inventions in the best mode, and furthermore, these terms or words should be construed as meanings and concepts consistent with the technical spirit of the present disclosure.

In other words, it should be noted that the terms used in the specification are only used to describe exemplary embodiments of the present disclosure and are not used with the intention of specifically limiting the contents of the present disclosure, and these terms are terms defined in consideration of various possibilities of the present disclosure.

In addition, in the specification, it should be noted that singular expressions may include plural expressions unless the context clearly dictates otherwise, and even when similarly expressed in plural, they may include singular meanings.

Throughout the specification, when a certain component is described as "including" another component, it may mean that the certain component may further include any other components rather than precluding any other components unless specifically stated to the contrary.

Furthermore, when a certain component is described as being "present therein or installed to be connected to" another component, it should be noted that this component may be installed in direct connection or in contact with another component and installed to be spaced a predetermined distance from another component, when this component is installed to be spaced the predetermined distance from another component, a third component or unit for fixing or connecting the corresponding component to another component may be present, and description of the third component or unit may be omitted.

On the other hand, when a certain component is described as being "directly connected" or "directly coupled" to another component, it should be understood that no third component or unit is present.

Likewise, other expressions that describe the relationship between components, such as "between" and "immediately between," or "neighboring" and "directly neighboring," have the same meaning.

In addition, in the specification, when terms such as "one surface," "the other surface," "one side," "the other side," "first," and "second," are used, it should be noted that one component is used to clearly distinguish one component from another component, and the meaning of the corresponding component is not limitedly used by these terms.

In addition, in the specification, when terms related to position such as "top," "bottom," "left," and "right," are used, it should be understood that the terms represent the relative positions of the corresponding components in the corresponding drawings, and unless absolute positions of these positions are specified, these position-related terms should not be understood as representing the absolute positions.

Furthermore, in the specification of the present disclosure, when terms such as " . . . unit," " . . . machine," "module," and "device," are used, it should be noted that these terms mean units capable of processing one or more functions or operations, which can be implemented by hardware, software, or a combination of hardware and software.

In addition, in the specification, when each component in each drawing is denoted by a reference numeral, the same reference numeral indicates the same component throughout the specification so that the same component has the same reference number even when this component is illustrated in different drawings.

In the accompanying drawings of the specification, sizes, positions, connection relationship, and the like of components constituting the present disclosure may be described by being partially exaggerated, reduced, or omitted in order to sufficiently clearly convey the spirit of the present disclosure or for convenience of description, and thus proportions or scales thereof may not be precise.

In addition, hereinafter, in describing the present disclosure, detailed descriptions of configurations that it is determined to unnecessarily obscure the gist of the present disclosure, for example, known technologies including the related art may be omitted.

Hereinafter, an apparatus and a method for synthesizing a 2D image and media using a reverse rendering including 3D spatially varying lighting information estimation according to an exemplary embodiment of the present disclosure will be described in detail with reference to the accompanying drawings.

Figure 3:
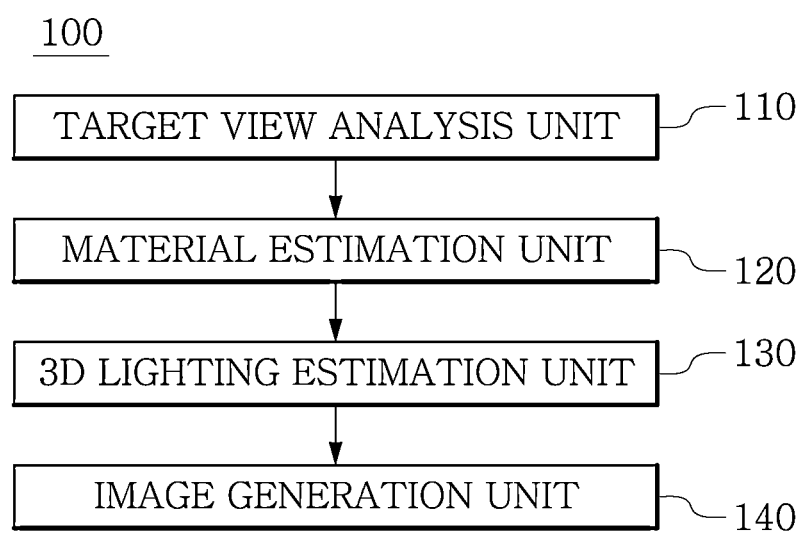
FIG. 3 is a view schematically illustrating a configuration of an apparatus for synthesizing a 2D image and media using a reverse rendering including 3D spatially varying lighting information estimation according to one embodiment of the present disclosure.

FIG. 3 is a view schematically illustrating a configuration of an apparatus for synthesizing a 2D image and media using a reverse rendering including 3D spatially varying lighting information estimation according to one embodiment of the present disclosure.

As illustrated in FIG. 3, an apparatus 100 for synthesizing a 2D image and media using a reverse rendering including 3D spatially varying lighting information estimation according to one embodiment of the present disclosure may include a target view analysis unit 110, a material estimation unit 120, a 3D lighting estimation unit 130, and an image generation unit 140.

Here, the target view analysis unit 110, the material estimation unit 120, and the 3D lighting estimation unit 130 may receive a plurality of 2D images (e.g., 9 2D images) having different views as input images and estimate geometries and materials of objects, and 3D spatially varying lighting information in the images from the plurality of input images based on a reverse rendering technology.

Meanwhile, the image generation unit 140 may reflect the shapes, materials, and 3D spatially varying lighting information estimated through the target view analysis unit 110, the material estimation unit 120, and the 3D lighting estimation unit 130 and synthesize 3D objects into 2D images.

In addition, the image generation unit 140 may reflect the shapes, materials, and 3D spatially varying lighting information estimated through the target view analysis unit 110, the material estimation unit 120, and the 3D lighting estimation unit 130 and generate novel view images.

In addition, the image generation unit 140 may reflect the shapes, materials, and 3D spatially varying lighting information estimated through the target view analysis unit 110, the material estimation unit 120, and the 3D lighting estimation unit 130 and generate synthesized images by inserting sounds into the 2D images.

Specifically, in the embodiment of the present disclosure, the shapes and materials of objects in the 2D images, and the 3D spatially varying lighting information may be estimated from the plurality of 2D input images through the target view analysis unit 110, the material estimation unit 120, and the 3D lighting estimation unit 130 based on the reverse rendering technology.

As described above, in the embodiment of the present disclosure, since shape information and material information of the spaces and objects captured from the 2D images through the reverse rendering technology may be estimated, when the sounds are inserted into the 2D images, the sounds corresponding to the spaces captured from the 2D images can be implemented by rendering the sounds based on the estimated information, and thus the synthesized images in which the sounds are inserted into the 2D images may be generated.

In addition, the image generation unit 140 may generate the synthesized images into which 3D objects and sounds are inserted into the 2D images by rendering the 3D objects and the sounds based on the shapes, materials, and 3D spatially varying lighting information estimated through the target view analysis unit 110, the material estimation unit 120, and the 3D lighting estimation unit 130.

Figure 4:
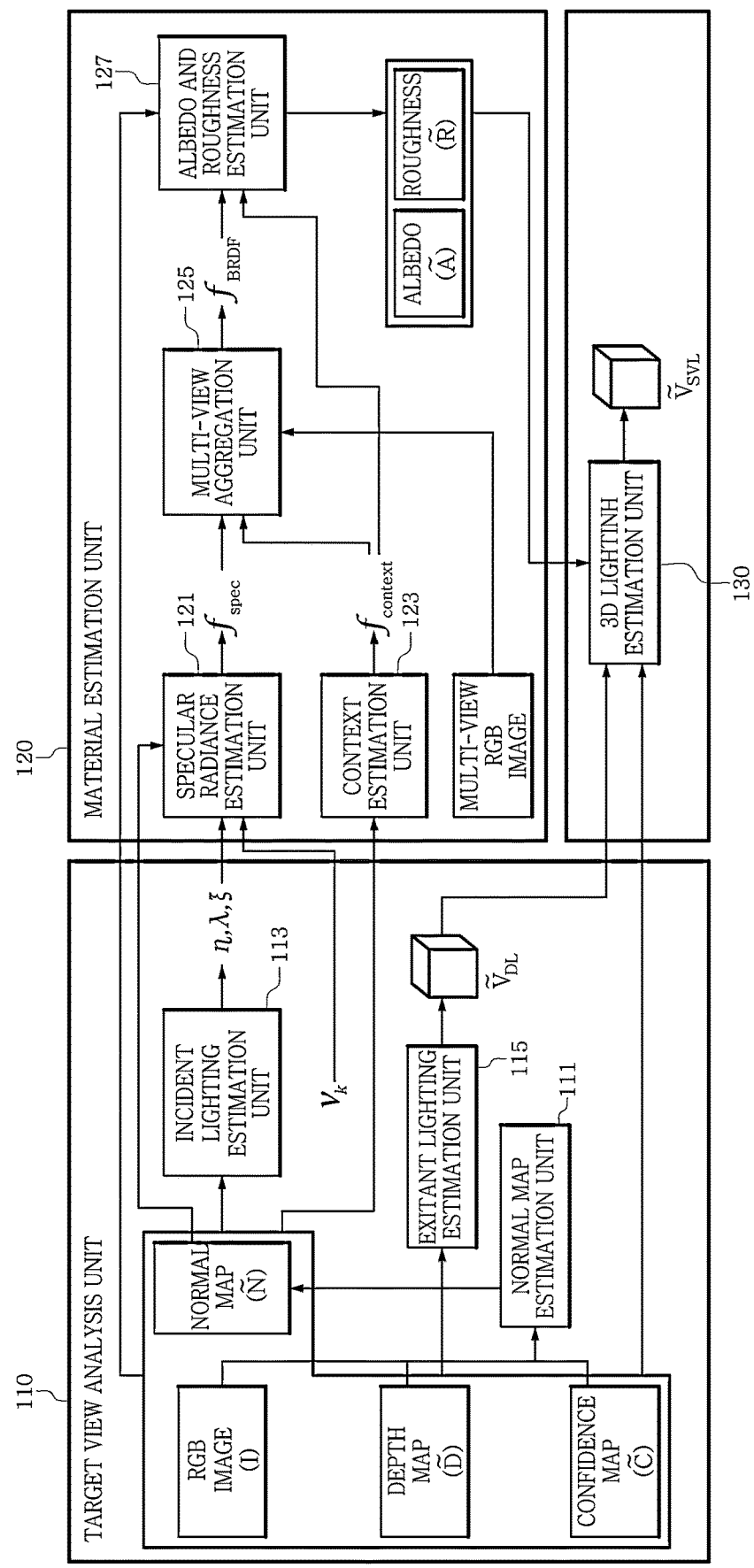
FIG. 4 is a view schematically illustrating a configuration of a target view analysis unit, a material estimation unit, a 3D lighting estimation unit applied to the present disclosure.

FIG. 4 is a view schematically illustrating a configuration of a target view analysis unit, a material estimation unit, a 3D lighting estimation unit applied to the present disclosure.

As illustrated in FIG. 4, the target view analysis unit 110 may estimate a normal map using the plurality of input 2D images (e.g., 9 2D images) and estimate incident direct lighting entering directly from one point of the space and exitant direct lighting emitted by being reflected from one point of the space.

The target view analysis unit 110 may include a normal map estimation unit 111 for estimating the normal map, an incident lighting estimation unit 113 for estimating incident direct lighting, which is light directly entering, and an exitant lighting estimation unit 115 for estimating exitant direct lighting, which is light emitted by being reflected.

In the embodiment of the present disclosure, inputs for the target view analysis unit 110 are k triples in which each triple may be composed of an RGB image with a size of H×W I∈ $\mathbb{R}^{3 \times H \times W}$, a depth map $\tilde{D} \in \mathbb{R}^{H \times W}$, and a confidence map $\tilde{C} \in \mathbb{R}^{H \times W}$.

Here, k denotes the number of views, the depth map $\tilde{D}$ and the confidence map $\tilde{C}$ can be obtained by using a multi view stereo (MVS) model.

The normal map estimation unit 111 may estimate a normal map $\tilde{N}$ from the depth map $\tilde{D}$.

In addition, the normal map estimation unit 111 may estimate the normal map $\tilde{N}$ using usable other information such as the RGB image I, a depth gradient map $\nabla \tilde{D} \in \mathbb{R}^{H \times W}$, the confidence map.

Here, when the usable other information is used, the normal map estimation unit 111 may better handle unreliable depth predictions.

The normal map estimation unit 111 can be implemented as NormalNet, and NormalNet can be expressed by Equation 1.

$$\tilde{N} = NormalNet(I, \tilde{D}, \nabla \tilde{D}, \tilde{C}), \tilde{N} \in \mathbb{R}^{3 \times H \times W} \quad \text{[Equation 1]}$$

The incident lighting estimation unit 113 may estimate incident direct lighting using the received RGB image I, the depth map $\tilde{D}$, the confidence map $\tilde{C}$, and the normal map $\tilde{N}$ obtained through the normal map estimation unit 111.

The incident lighting estimation unit 113 may estimate the incident direct lighting by adopting spatially-varying spherical Gaussians (SVSGs).

The incident lighting estimation unit 113 can be implemented as InDLNet, and InDLNet can be expressed by Equation 2.

$$\{\xi_s\}, \{\lambda_s\}, \{\eta_s\} = INDLNet(I, \tilde{N}, \tilde{D}, \tilde{C}) \quad \text{[Equation 2]}$$

In Equation 2, $\xi_s \in \mathbb{R}^2$ denotes a direction vector outward from a center of a unit sphere, $\lambda_s \in \mathbb{R}$ denotes sharpness, $\eta_s \in \mathbb{R}^3$ denotes intensity.

An environment map may be parameterized with $S_D$ SG lobes $\{\xi_s, \lambda_s, \eta_s\}_{s=1}^{S_D}$.

For an $s^{th}$ SG, a radiance $\mathcal{G}(l)$ in a direction $l \in \mathbb{R}^2$ can be obtained through Equation 3.

$$\mathcal{G}(l; \eta_s, \lambda_s, \xi_s) = \eta e^{\lambda_s (l \cdot \xi_s - 1)} \quad \text{[Equation 3]}$$

An incident radiance $R_i(l)$ in the direction l can be expressed by Equation 4 using all $S_D$ SG lobes.

$$\mathcal{R}_i(l) = \sum_{s=1}^{S_D} \mathcal{G}(l; \eta_s, \lambda_s, \xi_s) \quad \text{[Equation 4]}$$

In the embodiment of the present disclosure, much simpler direct lighting may be modeled by setting $S_D=3$.

In addition, in the embodiment of the present disclosure, a global intensity may be used to make SVSGs spatially coherent.

The exitant lighting estimation unit 115 may estimate exitant direct lighting using the received RGB image I, the depth map $\tilde{D}$, the confidence map $\tilde{C}$, and the normal map $\tilde{N}$ obtained through the normal map estimation unit 111.

The exitant lighting estimation unit 115 may estimate exitant direct lighting by adopting voxel-based expression called volumetric spherical Gaussian (VSG).

The exitant lighting estimation unit 115 can be implemented as ExDLNet, and ExDLNet may estimate an exitant direct lighting volume $\tilde{V}_{DL}$ as in Equation 5.

$$\tilde{V}_{DL} = ExDLNet(I, \tilde{N}, \tilde{D}, \tilde{C}), \tilde{V}_{DL} \in \mathbb{R}^{8 \times X \times Y \times Z} \quad \text{[Equation 5]}$$

Here, X, Y, and Z denote sizes of the volume.

Each voxel of the exitant direct lighting volume $\tilde{V}_{DL}$ includes opacity $\alpha$ and SG parameters ($\eta$, $\xi$, $\lambda$).

In the VSG, when alpha synthesis in the direction l is performed, an exitant radiance $R_e(l)$ may be calculated as in Equation 6.

$$\mathcal{R}_e(l) = \sum_{n=1}^{N_R} \prod_{m=1}^{n-1} (1 - \alpha_m) \alpha_n \mathcal{G}(-l; \eta_n, \lambda_n, \xi_n) \quad \text{[Equation 6]}$$

Here, $N_R$ denotes the number of ray samples, and $\eta_n$, $\lambda_n$, $\xi_n$ denotes SG parameters of the sample.

The intensity at which light converges to one point, that is, the incident radiance may function as a guidance for the target view analysis unit 110 to infer diffusion and specular reflections.

Meanwhile, information about how light is present in a 3D space, that is, exitant radiance may help the target view analysis unit 110 infer indirect lighting.

Figure 5:
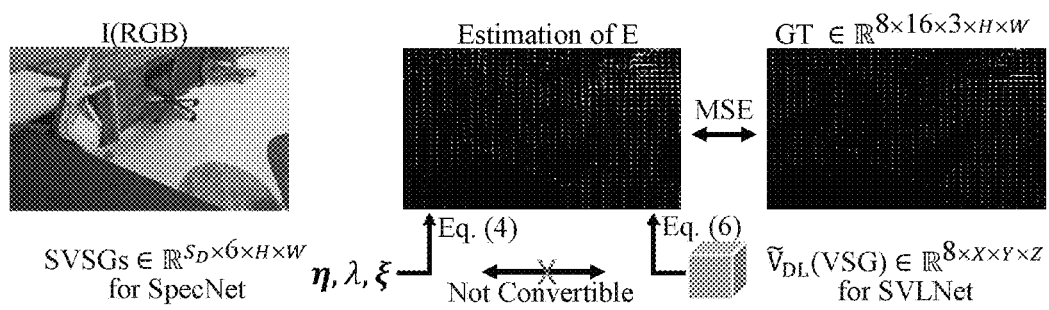
FIG. 5 is a view for describing incident/exitant direct lighting.

FIG. 5 is a view for describing incident/exitant direct lighting, and in FIG. 5, E denotes a per-pixel direct lighting environment map.

Meanwhile, the material estimation unit 120 may estimate the materials of the objects in the input images based on the information estimated through the target view analysis unit 110.

Specifically, the material estimation unit 120 may estimate Albedo and roughness information of scenes based on the normal map $\tilde{N}$ and the incident direct lighting estimated value ($\eta$, $\lambda$, $\xi$) estimated through the target view analysis unit 110, the RGB image I input to the target view analysis unit 110, the depth map $\tilde{D}$, the confidence map $\tilde{C}$, and the like.

The material estimation unit 120 may include a specular radiance estimation unit 121 capable of estimating a specular radiance feature, a context estimation unit 123 capable of estimating a context feature map, a multi-view aggregation unit 125 for aggregating the specular radiance features, the context features and RGB images, and an albedo and roughness estimation unit 127 for estimating albedo and roughness.

The specular radiance estimation map 121 of the material estimation unit 120 may estimate a specular radiance feature $f_{spec}$ based on the normal map $\tilde{N}$, the incident direct lighting estimated value ($\eta$, $\lambda$, $\xi$), and the like estimated through the target view analysis unit 110.

The specular radiance estimation unit 121 can be implemented as SpecNet.

First, the specular radiance feature $f_{spec}$ should be considered to estimate a bidirectional reflectance distribution function (BRDF) in the material estimation unit 120.

A diffuse radiance $\kappa$ and the specular radiance $\gamma$ of the Microfacet BRDF model expressed as a set of particles in which roughness of fine surfaces is small but complete reflection occurs can be expressed by Equations 7 and 8, respectively.

$$\kappa = \frac{\alpha}{\pi} \int_l L(l) n \cdot l \, dl, \kappa \in \mathbb{R}^3 \quad \text{[Equation 7]}$$

$$\gamma = \int_l L(l) B_s(v, l, n, r) n \cdot l \, dl, \gamma \in \mathbb{R}^3 \quad \text{[Equation 8]}$$

Here, a denotes diffuse albedo, l denotes a lighting direction, L(l) denotes a lighting intensity, $B_s$ denotes a specular BRDF, n denotes normal, r denotes roughness, and v denotes a viewing direction.

Since Equation 8 is very complicated, it is preferable to efficiently encode inputs to make it easier for the network to learn, and to this end, the arguments of $B_s$ can be expressed by Equation 9.

$$[\mathcal{F}(v, h), (n \cdot h)^2, n \cdot l, n \cdot v, r] \quad \text{[Equation 9]}$$

Here, F denotes a Fresnel equation, and h denotes a half vector.

Then, lighting of Equation 8 can be approximated by using SVSGs of Equation 2.

Since each SG lobe ($\xi$, $\lambda$, $\eta$) may be regarded as an individual light source, $\xi$, $\eta$, $\lambda$ may be regarded as l, L(l), and a parameter approximating integral, respectively.

As a result, $\gamma$ may be expressed by Equation 10.

$$\gamma = \sum_{s=1}^{S_D} g(\mathcal{F}(v, h_s), (n \cdot h_s)^2, n \cdot \xi_s, n \cdot v, \eta_s, \lambda_s, r) \quad \text{[Equation 10]}$$

Here, g denotes a newly defined function from re-parameterization.

The specular radiance estimation unit 121 can expressed by using Equation 10 as follows.

$$f_{spec}^k = \sum_{s=1}^{S_D} m_s SpecNet(\mathcal{F}(v_k, h_{s,k}), (\tilde{n} \cdot h_{s,k})^2 \tilde{n} \cdot \xi_s, \tilde{n} \cdot v_k, \eta_s, \lambda_s)$$ [Equation 11]

$$m_s = \begin{cases} 1 & \text{if } \|\eta_s\|_1 \tilde{n} \cdot \xi_s > 0, \\ 0 & \text{else}, \end{cases}$$ [Equation 12]

Here, k denotes $k^{th}$ view.

When an intensity $\|\eta_s\|1$ of the light source is zero or a dot product of the normal and a light axis $\tilde{n} \cdot \xi_s$ is smaller than zero, a binary indicator $m_s$ may be used to exclude the SG lobe from $\gamma$.

Since the specular radiance estimation unit 121 approximates Equation 8 using physically-motivated encoding, $f_{spec}$ may include a feature for specular radiance information.

In the embodiment of the present disclosure, a context feature map $f_{context}$=ContextNet(I, $\tilde{D}$, $\tilde{C}$, $\tilde{N}$) including a local context of a scene may be estimated by using the context estimation unit 123 other than the specular radiance estimation unit 121.

The context estimation unit 123 may estimate the context feature map $f_{context}$ based on the RGB image I input to the target view analysis unit 110, the depth map $\tilde{D}$, the confidence map $\tilde{C}$, and the like.

The context estimation unit 123 can be implemented as ContextNet.

The multi-view aggregation unit 125 may aggregate the specular radiance feature $f_{spec}$, the context feature map $f_{context}$, and the multi-view RGB image across the pixels from all $k^{th}$ views corresponding to a target view pixel considering an MVS depth.

The multi-view aggregation unit 125 can be implemented as MVANet.

In this case, some of pixel values may have negative effect when coming from wrong surfaces due to occlusion.

In order to consider occlusion, a depth projection error at a $k^{th}$ view denoted as $e_k=\max(-\log(|\tilde{d}_k-z_k|), 0)$ may be calculated.

Here, $\tilde{d}^k$ denotes a depth of a pixel position obtained by projecting a point seen from the target view as the $k^{th}$ view, and $z_k$ denotes a distance between the point and a camera center of the $k^{th}$ view.

The depth projection error $e \in \mathbb{R}^K$ can be obtained by aggregating $e_k$ at all $k^{th}$ views.

A mean and variance of RGB should be considered to estimate a material.

Therefore, the multi-view aggregation unit 125 may generate a value vector q by encoding inputs (colors, context features, and specular radiance features) for views, generate a mean and variance of q according to w, and then generate a multi-view aggregated feature m by re-encoding this.

Here, since m is generated from weighed mean and variance, m has multi-view information considering occlusion, and this process may be repeated once again for the target view.

The multi-view aggregation unit 125 performing the process may output an BRDF feature $f_{BRDF}$ as an output value.

Figure 6:
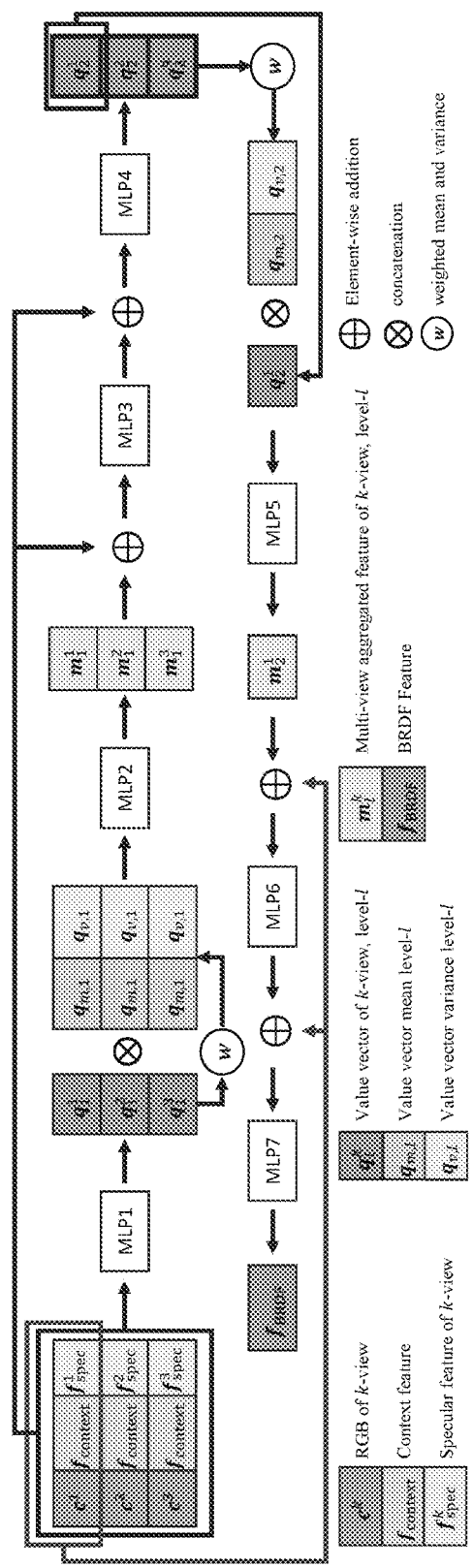
FIG. 6 is a view schematically illustrating a structure of a multi-view aggregation unit applied to the present disclosure.

FIG. 6 is a view schematically illustrating a structure of a multi-view aggregation unit applied to the present disclosure and is a view exemplarily illustrating the case of k=3.

As illustrated in FIG. 6, the multi-view aggregation unit 125 applied to the present disclosure may generate the value vector q by encoding colors, context features, and specular radiance features and generate the multi-view aggregated feature m using the multi-view weight w.

In the embodiment of the present disclosure, since the material estimation unit 120 should obtain an BRDF of a target view (1-view), only the value vector of the target view is processed.

In the embodiment of the present disclosure, since the multi-view aggregation unit 125 uses only local features, long-distance interactions in the images should be additionally considered for reverse rendering.

Therefore, the albedo and roughness estimation unit 127 may estimate albedo and roughness using the $f_{BRDF}$ of the multi-view aggregation unit 125.

Specifically, the albedo and roughness estimation unit 127 may estimate albedo and roughness based on the RGB image I input to the target view analysis unit 110, the depth map $\tilde{D}$, the confidence map $\tilde{C}$, the context feature $f_{context}$ estimated through the context estimation unit 123, the BRDF feature $f_{BRDF}$ output from the multi-view aggregation unit 125, and the like.

The albedo and roughness estimation unit 127 can be implemented as RefineNet, and RefineNet can be expressed by Equation 13.

$$\tilde{A}, \tilde{R} = RefineNet(I, \tilde{D}, \tilde{C}, \tilde{N}, f_{BRDF}, f_{context})$$ [Equation 13]

Meanwhile, the 3D lighting estimation unit 130 may estimate 3D spatially varying lighting information based on the RGB image I input to the target view analysis unit 110, the depth map $\tilde{D}$, the confidence map $\tilde{C}$, the exitant direct lighting volume $\tilde{V}_{DL}$ output from the exitant lighting estimation unit 115, and the albedo and roughness information estimated from the albedo and roughness estimation unit 127.

The 3D lighting estimation unit 130 can be implemented as SVLNet.

In order to estimate the 3D spatially varying lighting, a visible surface volume $T \in \mathbb{R}^{10 \times X \times Y \times Z}$ is generated.

In the embodiment of the present disclosure, T is initialized by re-projecting I, $\tilde{N}$, $\tilde{A}$, $\tilde{R}$ capable of modeling specularity.

For each voxel, (u,v) and d denotes projected coordinates of the center point and the depth, respectively.

Therefore, the local feature $t \in \mathbb{R}^{10}$ for each voxel may be initialized as follows. $\mathbb{R}^{10}$ $$\tilde{A}, \tilde{R} = RefineNet(I, \tilde{D}, \tilde{C}, \tilde{N}, f_{BRDF}, f_{context})$$ [Equation 14]

Here, $:\rho=e^{-\tilde{C}(u,v)(d-\tilde{D}(u,v))^2}$.

The confidence map $\tilde{C}$ is used to reflect the accuracy of the depth.

T and $\tilde{V}_{DL}$ may be supplied to the 3D lighting estimation unit 130 to generate an output $\tilde{V}_{SVL}$ representing the 3D spatially varying lighting volume as follows.

$$\tilde{V}_{SVL} = SVLNet(\tilde{V}_{DL}, T), \tilde{V}_{SVL} \in \mathbb{R}^{8 \times X \times Y \times Z}$$ [Equation 15]

As described above, the target view analysis unit 110, the material estimation unit 120, and the 3D lighting estimation unit 130 may estimate 3D spatially varying lighting information from the plurality of 2D images by performing a series of processes and output the 3D spatially varying lighting volume $V_{SVL}$.

The target view analysis unit 110, the material estimation unit 120, and the 3D lighting estimation unit 130 applied to the present disclosure may be learned by an OpenRooms forward facing (OpenRooms FF) data set.

The OpenRooms FF may consist of a high dynamic range (HDR) RGB image, a diffuse albedo image, a roughness image, a normal map, a binary mask, a depth map, and a per-pixel environment map.

The target view analysis unit 110, the material estimation unit 120, and the 3D lighting estimation unit 130 applied to the present disclosure may be learned individually.

Figure 7:
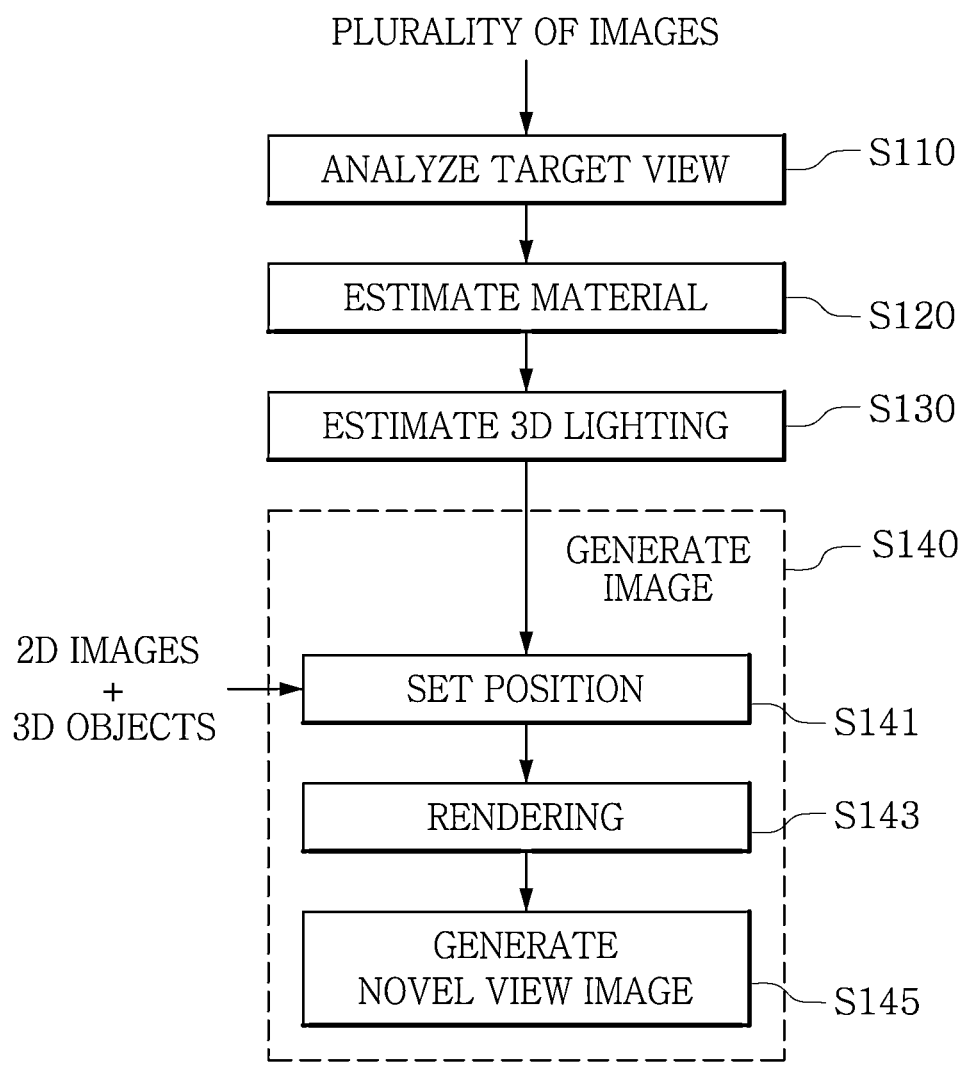
FIG. 7 is a flowchart for describing the method of synthesizing the 2D image and the media using the reverse rendering including 3D spatially varying lighting information estimation according to one embodiment of the present disclosure.

FIG. 7 is a flowchart for describing the method of synthesizing the 2D image and the media using the reverse rendering including 3D spatially varying lighting information estimation according to one embodiment of the present disclosure.

Since the method of synthesizing the 2D image and the media using the reverse rendering including 3D spatially varying lighting information estimation according to one embodiment of the present disclosure is performed on the configuration that is substantially the same as that of the apparatus 100 for synthesizing the 2D image and the media using the reverse rendering including 3D spatially varying lighting information estimation illustrated in FIGS. 3 and 4, the components that are the same as those of the apparatus 100 for synthesizing the 2D image and the media using the reverse rendering including 3D spatially varying lighting information estimation illustrated in FIGS. 3 and 4 are denoted by the same reference numerals, and overlapping descriptions thereof will be omitted.

First, in a target view analyzing operation S110, the target view analysis unit 110 may estimate a normal map using the plurality of input 2D images (e.g., 9 2D images) and estimate incident direct lighting entering directly from one point of the space and exitant direct lighting emitted by being reflected from one point of the space.

Specifically, in the target view analyzing operation S110, the target view analysis unit 110 may receive the RGB image acquired from the plurality of 2D images, the depth map, and the confidence map, estimate the normal map from the depth map through the normal map estimation unit 111, estimate the incident direct lighting using the RGB image, the depth map, the confidence map, and the normal map through the incident lighting estimation unit 113, and estimate the exitant direct lighting using the RGB image, the depth map, the confidence map, and the normal map through the exitant lighting estimation map 115.

In addition, in a material estimating operation S120, the material estimation unit 120 may estimate the materials of the objects in the input images based on the information estimated through the target view analyzing operation S110.

Specifically, in the material estimating operation S120, the material estimation unit 120 may estimate the specular radiance feature $f_{spec}$ and the context feature $f_{context}$ based on the normal map $\tilde{N}$ and an incident direct lighting estimated value $\eta, \lambda, \xi$ estimated through the target view analyzing operation S110, the RGB image I, the depth map $\tilde{D}$, and the confidence map $\tilde{C}$ input to the target view analysis unit 110, and the like, generate a multi-view aggregation feature by aggregating the estimated specular radiance feature $f_{spec}$ and context feature $f_{context}$, and a multi-view RGB image, and then estimate albedo and roughness information of a scene.

More specifically, in the material estimating operation S120, the material estimation unit 120 may estimate the specular radiance feature $f_{spec}$ based on the normal map $\tilde{N}$ and incident direct lighting estimated value $\eta, \lambda, \xi$ estimated in the target view analyzing operation S110 through the specular radiance estimation unit 121, estimate the context feature $f_{context}$ based on the RGB image I, the depth map $\tilde{D}$, and the confidence map $\tilde{C}$ through the context estimation unit 123, generate the multi-view aggregation feature by aggregating the specular radiance feature $f_{spec}$, the context feature $f_{context}$, and the multi-view RGB image through the multi-view aggregation unit 125, and estimate albedo and roughness based on the RGB image, the depth map, the confidence map, the context feature $f_{context}$, and a BRDF feature $f_{BRDF}$ output from the multi-view aggregation unit 125 through the albedo and roughness estimation unit 127.

In a 3D lighting estimating operation S130, the 3D lighting estimation unit 130 may reflect the RGB image I input to the target view analysis unit 110, the depth map $\tilde{D}$, the confidence map $\tilde{C}$, the exitant direct lighting volume estimated through the target view analyzing operation S110, the albedo and roughness information estimated in the material estimating operation S120, and the like, estimate the 3D spatially varying lighting information, and output the 3D spatially varying lighting volume.

Meanwhile, an image generating operation S140 is an operation of reflecting, by the image generation unit 140, the shapes, materials, and 3D spatially varying lighting information estimated through the target view analyzing operation S110 to the lighting estimating operation S130 and synthesize the 3D objects into the 2D image.

The image generating operation S140 may be subdivided into a position setting operation S141, a rendering operation S143, and a novel view image generating operation S145.

First, when the 3D objects to be synthesized with the target 2D image are input, in the position setting operation S141, the image generation unit 140 may set positions of the 3D objects to be synthesized into the 2D image.

Here, the input target 2D image is any one of the plurality of 2D images used in the target view analyzing operation S110.

In the rendering operation S143, lighting information at the 3D object positions set through the position setting operation S141 may be calculated by using the 3D spatially varying lighting volume acquired through the 3D lighting estimating operation S130, and the image (image) may be generated by rendering the 3D objects including shadows based on the calculated lighting information.

Here, since the shadows of the synthesized 3D objects may be matched with scene lighting, the synthesized 3D objects can be expressed realistically.

In the novel view image generating operation S145, a novel view image may be generated by using the 3D spatially varying lighting volume acquired through the 3D lighting estimating operation S130.

In the novel view image generating operation S145, the novel view image may be generated by applying a technology such as neural radiance fields (NeRF).

Specifically, by performing the operations S141 and S143 on all 2D images used in lighting estimation, the image in which the 3D objects are synthesized into all 2D images may be generated, then the NeRF may be learned with the generated image, and the novel view image may be generated by using the learned NeRF.

In addition, in the image generating operation S140, the synthesized image may be generated by reflecting the shapes, materials, and 3D spatially varying lighting information estimated through the target view analyzing operation S110 to the lighting estimating operation S130 and inserting sounds or 3D objects and sounds into the 2D image.

Figure 8:
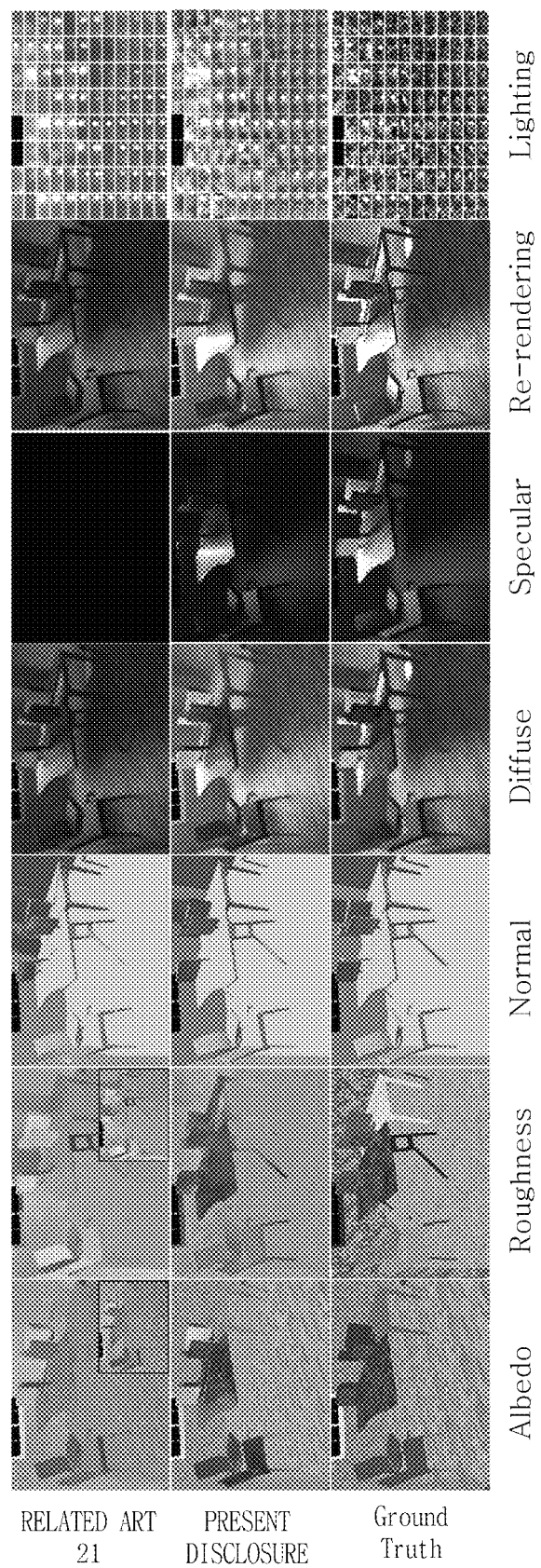
FIG. 8 is a view exemplarily illustrating various types of information estimated according to the present disclosure.

FIG. 8 is a view exemplarily illustrating various types of information estimated according to the present disclosure, and when lighting is estimated according to the present disclosure, it can be seen that more realistic result can be obtained by robustly and accurately estimating details of lighting and materials.

For reference, the small inserted screen in a first row of FIG. 8 is a result of estimating the material processed by bilatera solvers (BS).

Figure 9:
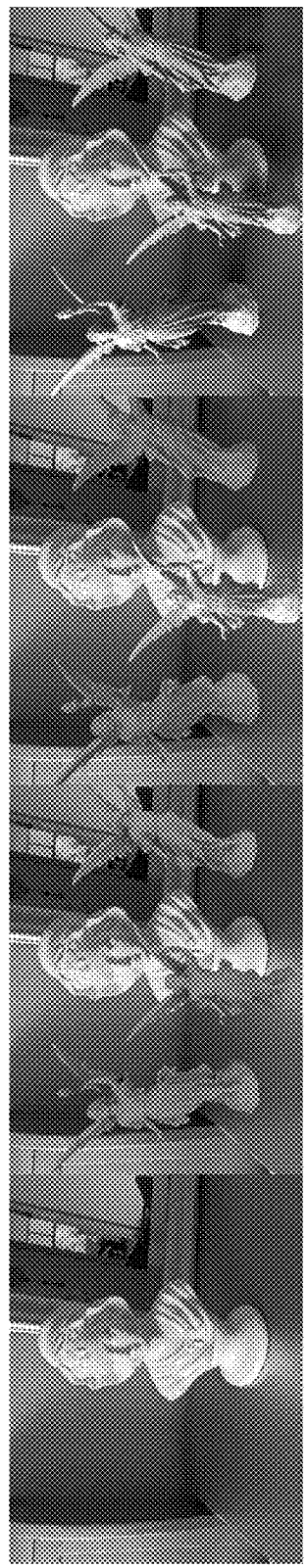
FIG. 9 is a view exemplarily illustrating 2D image-3D object synthesized images generated according to the present disclosure.

FIG. 9 is a view exemplarily illustrating a 2D image-3D object synthesized image generated according to the present disclosure, and it can be seen that the objects are more realistically inserted into the image generated according to the present disclosure compared to the image generated according to the related art.

FIG. 10 is a view illustrating a result of comparing the performance of the present disclosure and the related art, and it can be seen that the performance of the present disclosure has been improved.

Figure 11:
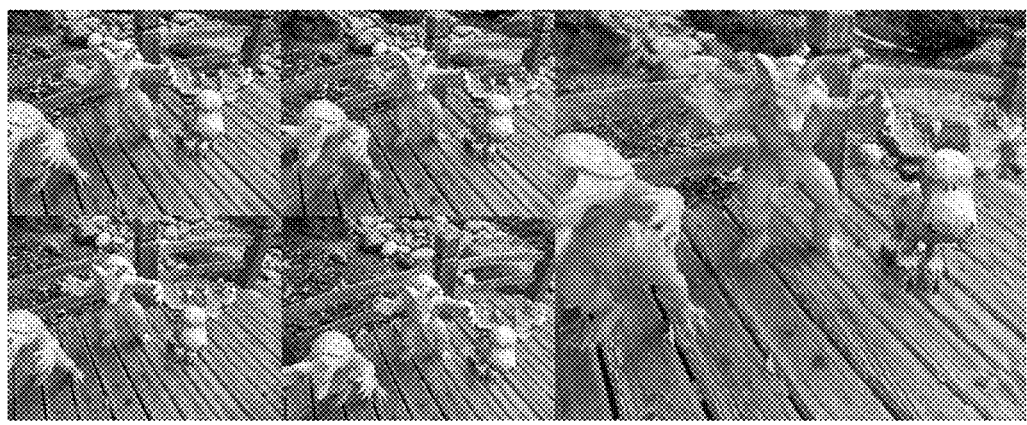
FIG. 11 is a view exemplarily illustrating novel view images generated according to the present disclosure.

FIG. 11 is a view exemplarily illustrating a novel view image generated according to the present disclosure, and it can be seen that the novel view image may be generated in the present disclosure.

Although various exemplary embodiments of the present disclosure have been descried above by giving some examples, the descriptions of various embodiments described in the "Mode for Invention" section are only illustrative, those skilled in the art to which the present disclosure pertains will easily understand that various modifications of the present disclosure can be carried out or equivalent embodiments of the present disclosure can be carried out from the above descriptions.

In addition, since the present disclosure can be implemented in various different forms, it should be noted that the present disclosure is not limited by the above description, the above description is to make the disclosed contents of the present disclosure complete and only provided to fully inform those skilled in the art to which the present disclosure pertains of the scope of the present disclosure, and the present disclosure is defined by the claims.

EXPLANATION OF SYMBOLS 100. apparatus,
110. target view analysis unit,
111. normal map estimation unit,
113. incident lighting estimation unit,
115. exitant lighting estimation unit,
120. material estimation unit,
121. specular radiance estimation unit,
123. context estimation unit,
125. multi-view aggregation unit,
127. roughness estimation unit,
130. 3D lighting estimation unit,
140. image generation unit

The invention claimed is:

1. An apparatus for synthesizing a 2D image and media using a reverse rendering including 3D spatially varying lighting information estimation, the apparatus comprising:
    a target view analysis unit configured to estimate a normal map and direct lighting using a plurality of 2D images;
    a material estimation unit configured to reflect the normal map and direct lighting estimated from the target view analysis unit and estimate material information;
    a 3D lighting estimation unit configured to reflect the direct lighting estimated from the target view analysis unit and the material information estimated from the material estimation unit and estimate 3D spatially varying lighting information; and
    an image generation unit configured to reflect the estimated shapes, materials, and 3D spatially varying lighting information, synthesize the 2D images with 3D objects, and generate a synthesized image.

2. The apparatus of claim 1, wherein the target view analysis unit includes:
    a normal map estimation unit configured to receive RGB images acquired from the plurality of 2D images, a depth map, and a confidence map and estimate a normal map from the depth map;
    an incident lighting estimation unit configured to estimate incident direct lighting using the RGB images, the depth map, the confidence map, and the normal map; and
    an exitant lighting estimation unit configured to estimate exitant direct lighting using the RGB images, the depth map, the confidence map, and the normal map.

3. The apparatus of claim 1, wherein the material estimation unit includes:
    a specular radiance estimation unit configured to estimate a specular radiance feature ($f_{spec}$) based on the normal map and an incident direct lighting estimated value ($\eta$, $\lambda$, $\xi$) estimated from the target view analysis unit;
    a context estimation unit configured to estimate a context feature ($f_{context}$) based on the RGB images, the depth map, and the confidence map;
    a multi-view aggregation unit configured to aggregate the specular radiance feature ($f_{spec}$), the context feature ($f_{context}$), and multi-view RGB images and generate a multi-view aggregation feature; and
    an albedo and roughness estimation unit configured to estimate albedo and roughness based on the RGB images, the depth map, the confidence map, the context feature ($f_{context}$), and a bidirectional reflectance distribution function (BRDF) feature ($f_{BRDF}$) output from the multi-view aggregation unit.

4. The apparatus of claim 1, wherein the 3D lighting estimation unit reflects the RGB images, the depth map, the confidence map, an exitant direct lighting volume estimated from the target view analysis unit, and the albedo and roughness information estimated from the material estimation unit, estimates the 3D spatially varying lighting information, and outputs the 3D spatially varying lighting volume.

5. The apparatus of claim 1, wherein the image generation unit reflects the shapes, materials, and 3D spatially varying lighting information estimated from the 3D lighting estimation unit and generates a novel view image.

6. The apparatus of claim 1, wherein the image generation unit reflects the shapes, materials, and 3D spatially varying lighting information estimated from the 3D lighting estimation unit, synthesizes sounds or 3D objects and the sounds into the 2D images, and generates a synthesized image.

7. A method of synthesizing a 2D image and media using a reverse rendering including 3D spatially varying lighting information estimation, the method comprising:
    a target view analyzing operation of estimating a normal map and direct lighting using a plurality of 2D images;
    a material estimating operation of reflecting the estimated normal map and direct lighting and estimating material information;

a 3D lighting estimating operation of reflecting the estimated direct lighting and material information and estimating 3D spatially varying lighting information; and an image generating operation of reflecting the estimated shapes, materials, and 3D spatially varying lighting information, synthesizing the 2D images with 3D objects, and generating an image.

8. The method of claim 7, wherein the target view analyzing operation includes:

receiving RGB images acquired from the plurality of 2D images, a depth map, and a confidence map;

estimating a normal map from the depth map;

estimating incident direct lighting using the RGB images, the depth map, the confidence map, and the normal map; and estimating exitant direct lighting using the RGB images, the depth map, the confidence map, and the normal map.

9. The method of claim 7, wherein the material estimating operation includes:

estimating a specular radiance feature ($f_{spec}$) based on the normal map and an incident direct lighting estimated value ($\eta, \lambda, \xi$) estimated from the target view analyzing operation;

estimating a context feature ($f_{context}$) based on the RGB images, the depth map, and the confidence map;

aggregating the specular radiance feature ($f_{spec}$), the context feature ($f_{context}$), and multi-view RGB images and generating a multi-view aggregation feature; and estimating albedo and roughness based on the RGB images, the depth map, the confidence map, the context feature ($f_{context}$), and a bidirectional reflectance distribution function (BRDF) feature ($f_{BRDF}$) output from a multi-view aggregation unit configured to generate the multi-view aggregation feature.

10. The method of claim 7, wherein the 3D lighting estimating operation includes reflecting the RGB images, the depth map, the confidence map, an exitant direct lighting volume estimated from the target view analyzing operation, and the albedo and roughness information estimated from the material estimating operation, estimating the 3D spatially varying lighting information, and outputting the 3D spatially varying lighting volume.

11. The method of claim 7, wherein the image generating operation includes:

setting positions of the 3D objects to be synthesized into a 2D image when the target 2D image and the 3D objects are input; and calculating lighting information at the set positions of the 3D objects using the 3D spatially varying lighting information volume acquired through the 3D lighting estimating operation and generating an image by rendering the 3D objects including shadows based on the calculated lighting information.

12. The method of claim 11, wherein the image generating operation further includes generating a novel view image using the 3D spatially varying lighting volume acquired through the 3D lighting estimating operation.

13. The method of claim 7, wherein the image generating operation includes reflecting the shapes, materials, and 3D spatially varying lighting information estimated from the 3D lighting estimating operation, synthesizing sounds or 3D objects and the sounds into the 2D images, and generating a synthesized image.

* * * * *